UNITED STATES PATENT OFFICE 2,374,035

MANUFACTURE OF ALKALI METAL SILICATES

Eugene G. Nutting, Jr., Grosse Ile, Mich., assignor, by mesne assignments, to Wyandotte Chemicals Corporation, Wyandotte, Mich., a corporation of Michigan No Drawing. Application April 22, 1943,
Serial No. 484,069

11 Claims. (Cl. 23—110)

The present invention relating as indicated to the manufacture of alkali metal silicates, has particular reference to a novel process for conducting the reaction between a caustic alkali, such as sodium or potassium hydroxide, and silicon dioxide, the latter being derived from a silica-bearing material, such as silica flour, quartz and sand. The chemical reaction involved is conveniently represented as follows:

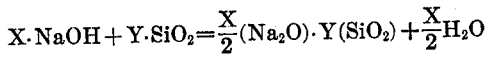

$$X \cdot NaOH + Y \cdot SiO_2 = \frac{X}{2}(Na_2O) \cdot Y(SiO_2) + \frac{X}{2}H_2O$$

As indicated from the above chemical equation, the resulting alkali silicate product may possess varying proportions of sodium hydroxide and silicon dioxide. Such products find extensive use in the field of detergents, such as metal cleaners and the like.

The reaction of the caustic alkali and silica ingredients in the solid state will occur to a slight extent even under atmospheric conditions. It is an exothermic reaction, which can be initiated and accelerated by the application of heat and agitation. If the reactants are subjected to heat while in the immobile state, the reaction propagates itself through the mass, and in ordinary commercial operation, where the reaction mass consists of several hundred pounds of the mixed ingredients, the time required is about two hours. Where the reactants are stirred or agitated during heating, the reaction time is much shorter; in fact, the reaction might even be termed to be "violent," and is completed in about fifteen minutes time. The reaction commences at about 175° C. followed by a rise in temperature from the applied heat as well as the heat of reaction. The temperature range for the reaction, in both procedures, whether the mass of reactants is immobile or agitated, is in the range of 175° to 250° C. During the course of this reaction, the material goes through a plastic or viscous stage which must be accommodated by either additional heating or mechanical working or both, in order that the resultant alkali silicate product will be of the desired discrete or granular particle form for subsequent use.

My invention has improved upon the above outlined prior procedures in that it enables the reaction to be completed in a much shorter time and eliminates the additional steps and apparatus heretofore required for transforming the alkali silicate material out of its plastic state.

Briefly outlined, my invention comprises the subjecting of the mixture of the solid particles of reacting ingredients to a compacting or pressure-forming action, such as by pressing the mixture into briquettes, and then subjecting it to elevated temperatures, well above the normal reaction temperature range, for a short period of time; producing a completely reacted product which is hard and porous, lending itself admirably to subsequent handling, packaging and use.

In addition to the saving in time effected by my invention, due to the much more rapid rate of reaction and the elimination of the necessity for treating the reaction product in its plastic stage, my invention also possesses the advantage of minimizing the amount of fines or dust-like particles present in the manufacturing process. This latter advantage, needless to say, contributes in a large measure to the physical comfort and safety of the workmen operating the process.

To the accomplishment of the foregoing and related ends said invention then consists of the steps of manufacture hereinafter fully described and particularly pointed out in the claims. The following description sets forth in detail certain methods exemplifying my invention, such disclosed procedure constituting, however, merely illustrative rather than limiting applications of the principle of the invention.

I first mix the reacting ingredients in solid, finely divided form and in proportions corresponding to that desired in the resultant alkali silicate product. The caustic alkali, either potassium or sodium hydroxide, but usually sodium hydroxide because that is the more abundantly available one in this country, may be in various forms, such as anhydrous caustic soda, which may be either in the forms of flakes, crystals or powder and the hydrated forms above 50% NaOH content which are solid at temperatures above 12° C. The silicon dioxide ingredient may be silica flour, ground quartz, sand, or any other comminuted form of silica-containing material, whether a natural occurring mineral or an artificially produced bi-product form. After these ingredients are mixed in the desired proportions, they are then subjected to a pressure sufficient to compact the individual particles tightly together and to form a self-sustaining briquette. Preferably the briquettes so produced are not over one cubic inch in volume; the briquetting pressure employed being in the range of 5,000 lbs. to 20,000 lbs. per square inch.

Additional alkaline material, in minor proportion, may be added to the original mixture to obtain certain desired properties in the final product. Sodium nitrate, sodium carbonate or soda ash, sodium bicarbonate or carbonic soda and silicate are examples of some of these additional minor ingredients.

The briquetted material is then subjected to an elevated temperature, suitably in the range of 600° to 800° C., which is well above the ordinary reaction temperature of 175° to 250° C. The caustic alkali silica reaction then takes place throughout the body of the briquette in a relatively short period of time, viz., five minutes or less. The resultant material is hard and porous, and may, after cooling, be immediately packaged and used as such; or, if desired, it may alternatively be ground, screened and classified into specified particle sizes before packaging.

The following specific examples will serve to illustrate the performance of the process embodying the principle of my invention in detail, and to enable those skilled in the art more readily to understand and practice the same.

*Example 1*

A mixture of 715 parts by weight of powdered caustic, 265 parts by weight of silica flour, 3 parts by weight of sodium nitrate and 27 parts by weight of commercial sodium bicarbonate was formed into a plurality of cylindrical briquettes having a base of one square inch area and about ¾ of an inch long, at a forming pressure of 10,000 lbs. to 15,000 lbs. per square inch. These briquettes were then subjected to a temperature of 800° C. in a suitable heating furnace for a period of five minutes. On removal from the furnace, the briquettes were of a blue color throughout, hard and porous. The reaction of the caustic soda and silica was complete within the requisites of commercial practice specifications, as subsequent chemical analysis disclosed the presence of only one part per thousand of unreacted silica.

*Example 2*

A mixture of 693 parts by weight of powdered caustic soda, 214 parts by weight of silica flour, 3 parts by weight of sodium nitrate and 100 parts by weight of a hydrous, spray dried, glassy sodium silicate of approximately 1 to 2 molecular $Na_2O$ to $SiO_2$ ratio was similarly briquetted, as in Example 1, and subjected to a temperature of 800° C. for a period of three minutes. The resulting briquettes were of a green color throughout their body, and of a hard and porous physical character. Here also the chemical reaction of the caustic soda and silica was found to be complete, and the test of unreacted silica in the final product disclosed not over one part per thousand.

It will thus be seen that the total heating and reaction time for producing alkali silicate products according to the principle of my invention is but a fraction of the time heretofore required, viz., three to five minutes as compared to the fifteen minutes which was the shortest time of heating as previously known. It is not possible at this time to ascribe any scientific theory to the operation and results achieved by my invention. However, it is believed that by the intimate pressing together of the particles of the reacting materials and the utilization of the elevated temperatures, viz. 600° to 800° C., well above the ordinary reaction temperatures, that the caustic alkali-silica reaction begins and propagates itself throughout the pressed mass so rapidly, and from one particle to the other, that there is no opportunity for the plastic or viscous stage to be encountered.

Other modes of applying the principle of my invention may be employed instead of the one explained, change being made as regards the method herein disclosed, provided the steps stated by any of the following claims or the equivalent of such stated steps be employed.

I therefore particularly point out and distinctly claim as my invention:

1. The method of making alkali metal silicates consisting in the steps of pressing together a mixture of solid caustic alkali and silica until the individual particles are compacted tightly together and form a self-sustaining mass, then subjecting such pressed mixture to a temperature above 600° C. for a period of a few minutes of time whereby the caustic alkali and silica rapidly react.

2. The method of making alkali metal silicates consisting in the steps of pressing together a mixture of solid caustic alkali and silica until the individual particles are compacted tightly together and form a self-sustaining mass, then subjecting such pressed mixture to a temperature of substantially 600–800° C. for a period of substantially three to five minutes whereby the caustic alkali and silica rapidly react.

3. The method of making alkali metal silicates consisting in the steps of pressing a mixture of solid caustic alkali and silica particles until the individual particles are compacted together and form self-sustaining briquettes, and then subjecting said briquettes to a temperature above 600° C. for a period of a few minutes of time whereby the caustic alkali and silica rapidly react.

4. The method of making alkali metal silicates consisting in the steps of pressing a mixture of solid caustic alkali and silica particles until the individual particles are compacted together and form self-sustaining briquettes, and then subjecting said briquettes to a temperature of substantially 600–800° C. for a period of substantially three to five minutes whereby the caustic alkali and silica rapidly react.

5. The method of making alkali metal silicates consisting in the steps of molding a mixture of solid caustic alkali and silica particles into briquettes at a molding pressure of 5,000 to 20,000 lbs. per square inch, then subjecting said briquettes to a temperature above 600° C. for a period of a few minutes of time whereby the caustic alkali and silica rapidly react.

6. The method of making alkali metal silicates consisting in the steps of molding a mixture of solid caustic alkali and silica particles into briquettes at a molding pressure of 5,000 to 20,000 lbs. per square inch, then subjecting said briquettes to a temperature of substantially 600 to 800° C. for a period of substantially three to five minutes whereby the caustic alkali and silica rapidly react.

7. The method of making alkali metal silicates consisting in the steps of pressing together a mixture of finely divided, anhydrous caustic soda and silica flour until the individual particles are compacted tightly together and form self-sustaining briquettes, then subjecting said briquettes to a temperature above 600° C. for a period of a few minutes of time whereby said caustic soda and said silica flour rapidly react to form relatively hard, porous briquettes of sodium silicate.

8. The method of making alkali metal silicates consisting in the steps of pressing together a mixture of finely divided, anhydrous caustic soda and silica flour until the individual particles are compacted tightly together and form self-sustaining briquettes, then subjecting said briquettes to a temperature of substantially 600° to 800° C. for a period of substantially three to five minutes whereby said caustic soda and said silica flour rapidly react to form relatively hard, porous briquettes of sodium silicate.

9. The method of making alkali metal silicates consisting in the steps of pressing together a mixture of finely divided, anhydrous caustic soda and silica flour until the individual particles are compacted tightly together and form self-sustaining briquettes of not over one cubic inch in volume, then subjecting said briquettes to a temperature of substantially 600° to 800° C. for a period of substantially three to five minutes whereby said caustic soda and said silica flour rapidly react to form relatively hard, porous briquettes of sodium silicate.

10. The method of making a sodium silicate compound consisting in the steps of mixing together 715 parts by weight of powdered, anhydrous caustic soda, 265 parts by weight of silica flour, 3 parts by weight of sodium nitrate and 27 parts by weight of sodium bicarbonate, pressing such mixture into briquettes of not over one cubic inch in volume at a pressure of 10,000 lbs. to 15,000 lbs. per square inch, and then subjecting said briquettes to a temperature of approximately 800° C. for a period of five minutes, thereby producing a blue, relatively hard and porous sodium silicate product.

11. The method of making a sodium silicate compound consisting in the steps of mixing together 693 parts by weight of powdered, anhydrous caustic soda, 214 parts by weight of silica flour, 3 parts by weight of sodium nitrate and 100 parts by weight of a hydrous sodium silicate, pressing such mixture into briquettes of not over one cubic inch in volume at a pressure of 10,000 lbs. to 15,000 lbs. per square inch, and then subjecting such briquettes to a temperature of approximately 800° C. for a period of three minutes, to produce a green, relatively hard and porous sodium silicate product.

EUGENE G. NUTTING, Jr.